US006735958B2

(12) United States Patent
Baumann

(10) Patent No.: US 6,735,958 B2
(45) Date of Patent: May 18, 2004

(54) SYSTEM FOR HOLDING FOOD IN A READY-TO-SERVE STATE

(75) Inventor: Udo Baumann, Hamburg (DE)

(73) Assignee: Electrolux Professional GmbH, Hamburg (DE)

( * ) Notice: Subject to any disclaimer, the term of this patent is extended or adjusted under 35 U.S.C. 154(b) by 0 days.

(21) Appl. No.: 10/412,485

(22) Filed: Apr. 11, 2003

(65) Prior Publication Data

US 2003/0192321 A1 Oct. 16, 2003

(30) Foreign Application Priority Data

Apr. 12, 2002 (DE) ......................... 102 16 238
Sep. 27, 2002 (DE) ......................... 102 45 280

(51) Int. Cl.[7] .......................................... F25B 21/02
(52) U.S. Cl. ............................. 62/3.3; 62/244
(58) Field of Search ................. 62/3.3, 3.6, 3.61, 62/244, 259.2

(56) References Cited

U.S. PATENT DOCUMENTS

| 3,214,922 A | | 11/1965 | Koblischek | |
| 3,314,242 A | * | 4/1967 | Lefferts | 62/3.6 |
| 3,808,825 A | * | 5/1974 | Ciurea | 62/3.3 |
| 5,514,852 A | * | 5/1996 | Takamori et al. | 219/388 |
| 5,588,300 A | * | 12/1996 | Larsson et al. | 62/3.61 |
| 5,941,077 A | | 8/1999 | Safyan | |

FOREIGN PATENT DOCUMENTS

| DE | 199 45 498 A1 | 3/2001 |
| FR | 2604882 | 4/1988 |

* cited by examiner

Primary Examiner—Melvin Jones
(74) Attorney, Agent, or Firm—Pearne & Gordon LLP

(57) ABSTRACT

This invention relates to a system for holding food in ready-to-serve state, comprising one or several heat-conducting plates (6) on which the food can be placed, either directly or in dishes, in ready-to-serve fashion;

one or several Peltier elements or similar devices and one or several heating elements, each of which is or can be thermally coupled to the plate(s) (6) and/or to the dishes;

one or several selector switches (22) as operating controls or the radio-signal receivers of such selector switches by means of which it is possible to select temperatures and/or temperature cycles and/or warming or cooling modes of the plate(s) (6), a control unit by means of which, in response to the selection made via the selector switches (22), the Peltier element(s) can be enabled to cool the plate(s) and/or the Peltier element(s) and/or the heating element (s) can be energized to heat the plate(s).

20 Claims, 2 Drawing Sheets

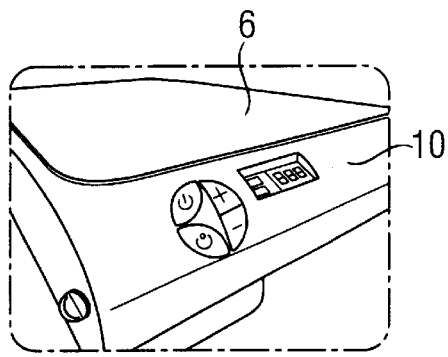
Fig. 2
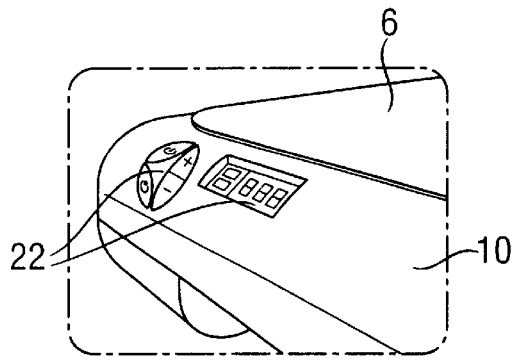
Fig. 3
Fig. 5
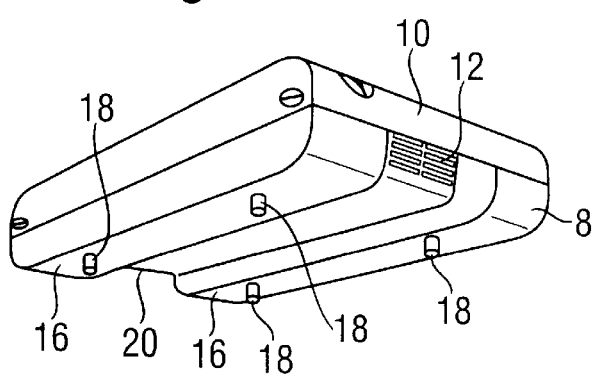
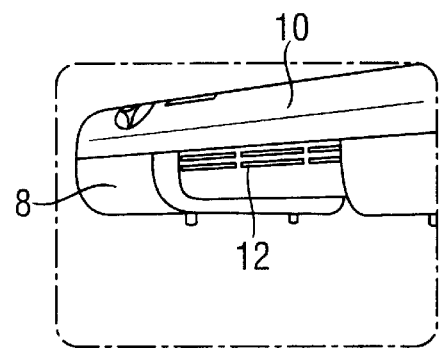
Fig. 4
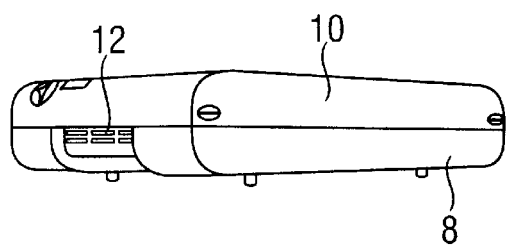
Fig. 7
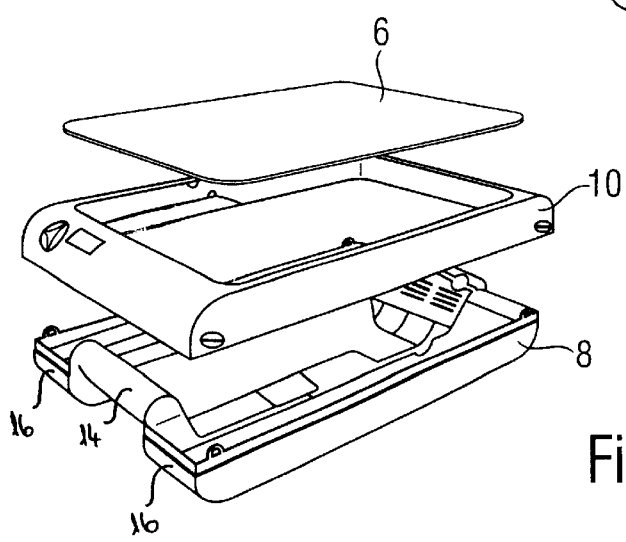
Fig. 6

SYSTEM FOR HOLDING FOOD IN A READY-TO-SERVE STATE

This invention relates to a system for holding food in a ready-to-serve state.

In large commercial kitchens it has become common practice to prepare and freeze food several days before it is served so that a few hours prior to being served it can be thawed, divided into portions, made up and, until served, placed on plates that allow the food to be cooled and/or reheated and kept warm.

An earlier design of a warm-up and cooling tray for ready-to-serve food, described in U.S. Pat. No. 5,941,077, features two heat-conducting plates in an enclosure, two Peltier elements positioned underneath these plates, a control device for switching the Peltier elements into a plate-cooling or plate-heating mode, as well as selector switches for selecting the desired mode and temperature.

That type of heating and cooling tray, however, cannot produce plate temperatures that lead to ready-to-serve temperatures within the food in line with current requirements in terms of hygienic considerations, for instance 65° C. (150° F.) in Europe.

It is therefore the objective of this invention to provide a system for holding food in ready-to-serve state, permitting compliance with current hygienic requirements.

According to the invention this is accomplished with the functional features specified in claim 1. Desirable design variations are described in the subclaims.

The system for holding food in a ready-to-serve state encompasses the following:
- one or several heat-conducting plates that can accommodate the food items directly or in containers, ready to be served;
- one or several Peltier elements or similar devices as well as one or several heating elements that are or can be coupled to the plate and/or to the containers;
- one or several selector switches as well as radio-signal receivers for selector switches by means of which it is possible to select temperatures and/or temperature cycles and/or plate heating and cooling modes; and
- a control system capable of activating the Peltier element(s) in accordance with the selection made via the selector switches for the cooling of the plate(s) and, correspondingly, of activating the Peltier element(s) and/or the heating elements for heating the plate(s).

Due to the fact that heating elements can heat the plate(s) more quickly and/or to higher temperature levels than is possible with Peltier elements alone, temperatures can be obtained within the food items that meet the current hygienic requirements.

Specifically, the heating element(s) is/are positioned under the bottom surface of the plate(s) and is/are preferably in the form of sheet- and/or foil-type and/or thin-film and/or screen-printed heaters.

The plate(s) is/are preferably made from a glass-ceramic material but may alternatively consist of metal, glass, ceramics or stone. It is/they are preferably mounted on a horizontal, circular frame that sits on a base whose bottom is closed.

The plate(s) may be snapped onto the frame and/or the frame onto the base. The dimensions of the frame and/or the base specifically correspond to one or several standards of the restaurant trade.

Viewed from the side, the frame and base are inversely symmetrical. The frame preferably accommodates the selector switches and/or their associated radio-signal receivers and/or the control system while the base houses a power supply and/or a cooling fan. Mounted on the bottom surface of the base are two mutually parallel skids.

The Peltier element(s) is/are primarily located on the bottom surface of the plate(s) and/or on the bottom surface of the heating element(s).

The plate(s) may be heated at the selected temperature and/or temperature cycle by means of the Peltier element(s). In that case the temperatures and/or temperature cycles selected would primarily be warming temperatures or warming cycles.

It is also possible, however, to heat the plate(s) to/at the selected temperature or temperature cycle either by means of the heating elements alone or jointly with both the Peltier element(s) and the heating element(s). In that case the temperatures and/or temperature cycles selected would typically be warming or cooking temperatures or, respectively, warming or cooking cycles, with warming temperatures and warming cycles attainable and controllable more rapidly and with less delay than with the sole use of Peltier elements.

The following describes this invention in more detail with reference to an implementation example illustrated in the attached schematic diagrams in which—

FIG. 2 is a perspective front view, from the top left, of the heating/cooling plate;

FIG. 3 shows the indicator and operating panel;

FIG. 4 is a front view;

FIG. 5 is a perspective front view, from the bottom left, of the heating/cooling plate;

FIG. 6 is an exploded perspective front view from the top right; and

FIG. 7 is a view of the heating/cooling plate at an oblique angle from the right, showing its front end and one longitudinal side.

Figure 1:
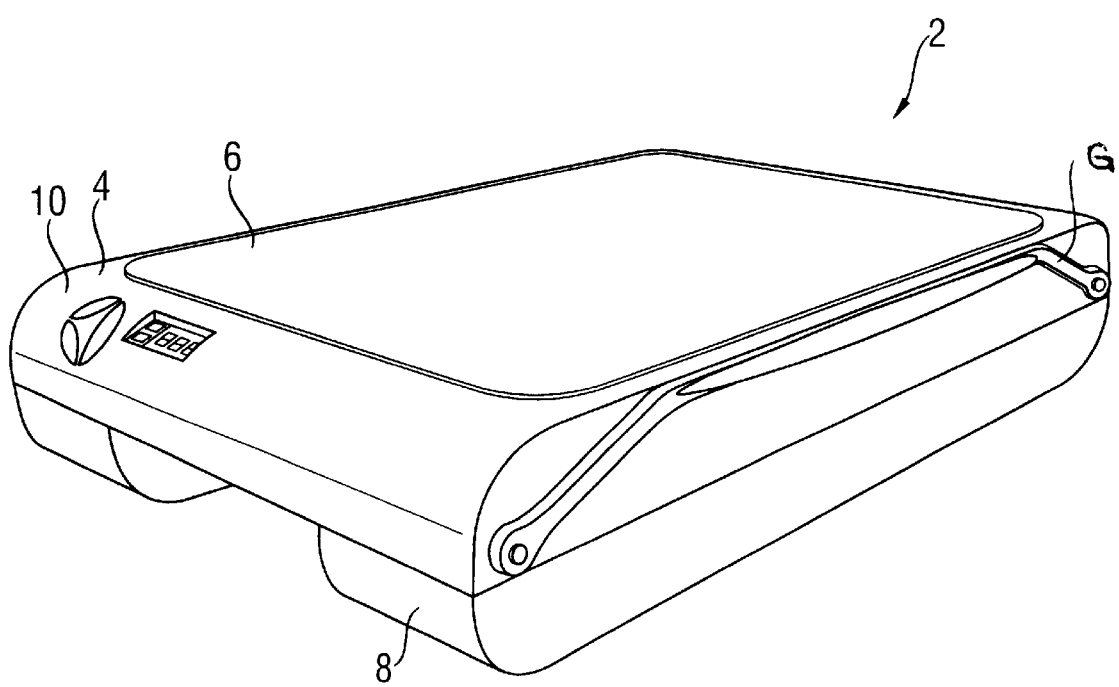
FIG. 1 is a perspective front view, from the top right, of a heating/cooling plate.

The outer contour of the heating/cooling plate 2 is defined by an enclosure 4 made of stainless steel or ABS plastic and accommodating on its top surface a glass-ceramic plate 6. The enclosure 4 is composed of a tub-shaped base 8 that is closed toward the bottom and the sides, and a frame-like top section 10 that is closed only towards the sides. The upper rim of the base 8 and the lower rim of the top section 10 are at least in part offset inwards, whereby both sections fit together in matching, positive-fit fashion.

The base 8 is provided in front and back with cooling louvers 12. It also houses a blower and a power supply, both not illustrated. Its front end features a handle-like element 14 that rises past its upper rim and in the assembled state of the system extends fully into the top section 10. The area underneath the bottom surface in the longitudinal direction of the base has a tripartite configuration, with two wide outer skids 16 featuring peg feet 18 and a space in between whose width matches the opening of the handle-like element 14. The longitudinal sides of the base are vertical, its front and rear are cambered up- and outward in mirror-image fashion relative to each other.

The top section 10 on its part has vertical longitudinal sides and its front and rear are cambered down- and outward in mirror-image fashion relative to each other. The horizontal front end features an operating and/or indicator panel 22 and, not shown, a control unit. The longitudinal and horizontal walls protrude past the perimeter of the glass-ceramic plate 6 by a fraction of the thickness of the latter.

Located underneath the bottom surface of the glass-ceramic plate 6 is a foil-type heating element, not shown, underneath whose bottom surface in turn two Peltier elements, not illustrated, are situated. Both the foil-type heater and the Peltier elements extend over the full area of the plate.

The Peltier elements are thermoelectric converter elements whose effect is based on the Peltier principle in that they are capable of both cooling and heating by virtue of the fact that between their electrodes a temperature differential is created whose directionality is a function of the direction of the current. Accordingly, one planar electrode is located next to the glass-ceramic plate while the other planar electrode faces the base and thus the cooling fan.

FIG. 1 shows slide rails G that may be additionally mounted on the sides, permitting the dimensionally correct insertion of the plate in commercial restaurant units or in bakers' and Euro-standard units, and also specifically under so-called chafing dishes.

The way it works is as follows:

When food that is to be served hot has been prepared and placed on the plate or in a dish on the plate, the selector switches 22 offer at least three options.

In a first case, the initial step shortly before serving is to set the selector switches 22 in the food-reheating or warming mode employing the Peltier process, whereby the control unit selects a predefined warm-up temperature, switching the Peltier elements i.e. their electrodes next to the glass-ceramic plate into a corresponding heating mode. If the predefined default heating or cooking temperature is not attained, the electronic control will automatically switch over to the alternate heating system. The heat generated at the electrode is transferred via the glass-ceramic plate to the food or to the dishes containing the food in the same way as the heat emanating from the foil-type heating element is transferred to the food or to the dishes containing the food.

In a second case, the selector switches 22 permit the setting of specific initial cooling temperatures followed by specific reheating temperatures, whereby the Peltier elements and the foil-type heating elements are activated according to the temperatures selected.

Finally, in a third case, the selector switches 22 permit the setting of a temperature cycle for cooling by means of the Peltier system.

If food has been prepared and placed on the plate or in a dish on the plate, to be served cold a few hours later, the selector switches 22 again offer at least three options.

In a first case it is only necessary to set the selector switches 22 for a cooling mode, whereby the control system switches to a predefined cooling temperature, activating the Peltier elements i.e. their electrodes next to the glass-ceramic plate in that particular cooling mode. The cold temperature generated by the electrode is again transferred via the glass-ceramic plate to the food or to the dishes containing the food.

In a second case the selector switches 22 are set for specific cooling temperatures, whereby the Peltier elements are activated in accordance with the temperatures selected.

Finally, in a third case, the selector switches 22 can be set for a temperature cycle whereby, as an example, a standby mode is created at cooling temperatures that rise slightly just before the food is served.

It is also possible by means of the selector switches 22 to enter cooling and/or heating time lengths and/or specific serving times.

What is claimed is:

1. System for holding food in a ready-to-serve state, comprising
   one or several heat-conducting plates (6) on which the food can be placed, either directly or in dishes, in ready-to-serve fashion;
   one or several Peltier elements or similar devices and one or several heating elements, each of which is or can be thermally coupled to the plate(s) (6) and/or to the dishes;
   one or several selector switches (22) as operating controls or the radio-signal receivers of such selector switches by means of which it is possible to select temperatures and/or temperature cycles and/or warming or cooling modes of the plate(s) (6), as well as a control unit by means of which, in response to the selection made via the selector switches (22), the Peltier element(s) can be enabled to cool the plate(s) and/or the Peltier element (s) and/or the heating element(s) can be energized to heat the plate(s).

2. System as in claim 1, in which, by employing the heating elements, the plate(s) (6) can be heated more rapidly and/or to higher temperatures than is possible with the Peltier element(s) alone.

3. System as in claim 1, in which the heating element(s) is/are mounted under the bottom surface of the plate(s) (6).

4. System as in claim 1, in which the heating element(s) is/are in the form of planar sheet- and/or foil-type and/or thin-film and/or screen-printed heating elements.

5. System as in claim 1, in which the plate(s) (6) consist(s) of a glass ceramic.

6. System as in claim 1, in which the plate(s) (6) is/are mounted on a circular horizontal frame (10) supported by a base (8) with a closed bottom.

7. System as in claim 6, in which the plate(s) (6) can be snapped onto the frame (10) and/or the frame (10) can be snapped onto the base (8).

8. System as in claim 6, in which the dimensions of the circular horizontal frame (10) including the slide rails and/or the base (8) correspond to one or several standards of the restaurant trade, bakers' trade or Eurostandards.

9. System as in claim 6, in which the frame (10) and the base (8), as viewed from the side, are symmetrical in mirror-image fashion.

10. System as in claim 6, in which the frame (10) accommodate the selector switches (22) and/or their radio-signal receivers and/or the control unit.

11. System as in claim 6, in which the base (8) accommodates a power supply and/or a cooling fan.

12. System as in claim 6, in which the base (8) is provided on its bottom surface with two mutually parallel skids (16) as well as specifically adjustable support feet.

13. System as in claim 1, in which the Peltier element(s) is/are positioned next to the bottom surface of the plate(s) (6) and/or next to the bottom surface of the heating element(s).

14. System as in claim 1, in which the plate(s) is/are heated by means of the Peltier element(s) according to the temperature and/or temperature cycle selected.

15. System as in claim 14, in which the temperatures and/or temperature cycles selected are warming temperatures or warming cycles, respectively.

16. System as in claim 1, in which the plate(s) is/are heated by means of the heating element(s) according to the temperature and/or temperature cycle selected and, specifically, cooking temperatures in excess of 100° C. (212° F.) can be attained.

17. System as in claim 1, in which the plate(s) is/are heated by means of both the Peltier element(s) and the heating element(s).

18. System as in claim 16, in which the temperatures and/or temperature cycles selected are warming or cooking temperatures or, respectively, warming or cooking cycles.

19. System as in claim 1, in which the plate(s) is/are cooled by means of the Peltier element(s) in accordance with the temperature and/or temperature cycle selected.

20. System as in claim 19, in which the temperatures and/or temperature cycles selected are cooling temperatures or cooling cycles.

* * * * *

UNITED STATES PATENT AND TRADEMARK OFFICE
CERTIFICATE OF CORRECTION

PATENT NO. : 6,735,958 B2
DATED : May 18, 2004
INVENTOR(S) : Baumann

It is certified that error appears in the above-identified patent and that said Letters Patent is hereby corrected as shown below:

<u>Title page,</u>
Item [30], Foreign Application Priority Data, please delete
"Apr. 12, 2002   (DE)…….. 102 16 238
  Sept. 27, 2002   (DE)…….. 102 45 280" and insert therefor
-- Apr. 12, 2002     (DE)…………. 102 16 238.7
  Sept. 27, 2002     (DE)…………. 102 45 280.6 --
Item [56], References Cited, FOREIGN PATENT DOCUMENTS, please insert therefor
-- DE   197 57 004 C2  11/2000
   DE   200 19 219 U1  04/2001
   DE   199 24 999 C2  04/2002 --

Signed and Sealed this

Third Day of August, 2004

JON W. DUDAS
*Acting Director of the United States Patent and Trademark Office*